United States Patent

Rajput

[11] 4,040,676
[45] Aug. 9, 1977

[54] ANTI-SKID BRAKE CONTROL SYSTEM WITH SHORT CIRCUIT PROTECTION

[75] Inventor: Yudh Vir Rajput, Dayton, Ohio

[73] Assignee: The B. F. Goodrich Company, Akron, Ohio

[21] Appl. No.: 685,267

[22] Filed: May 11, 1976

[51] Int. Cl.² .............................................. B60T 8/00
[52] U.S. Cl. ...................................... 303/92; 340/53; 340/253 R
[58] Field of Search .................. 303/92; 340/52 B, 53, 340/253 R

[56] References Cited

U.S. PATENT DOCUMENTS

| 3,825,307 | 7/1974 | Carr | 303/92 |
|---|---|---|---|
| 3,911,392 | 10/1975 | Fleagle | 303/92 |
| 3,917,359 | 11/1975 | Sapir | 303/92 |
| 3,920,284 | 11/1975 | Lane | 303/92 |
| 3,944,288 | 3/1976 | Bertolasi | 303/92 |

*Primary Examiner*—Trygve M. Blix
*Assistant Examiner*—Reinhard J. Eisenzopf
*Attorney, Agent, or Firm*—Harry F. Pepper, Jr.; W. A. Shira, Jr.

[57] ABSTRACT

In an anti-skid brake control system, a circuit detects the presence of a short circuit condition and upon such detection disables the system itself. Therefore, false indications or displays, excessive battery draining, overcurrent damage to system components, and the like, which may be caused by such a short circuit condition, are avoided.

5 Claims, 2 Drawing Figures

4,040,676

ANTI-SKID BRAKE CONTROL SYSTEM WITH SHORT CIRCUIT PROTECTION

BACKGROUND OF THE INVENTION

The present invention relates generally to anti-skid brake control systems for normally over-riding manual operation of the brakes of a vehicle upon sensing a skid condition and, more particularly, relates to a short circuit detector in such a system for disabling the system when a short circuit condition is detected therein.

In electrical systems associated with vehicles there is a possibility of encountering a short circuit condition whereby a wire of such a system inadvertently becomes electrically coupled to the vehicle chassis or the like, for example, when a sharp object scrapes the insulation from a wire, and the short circuit usually will render one or more of the vehicle electrical systems inoperative. Continuation of the short circuit condition may drain the vehicle battery or other power supply and/or the unusually heavy current flow due to the short circuit may damage other electrical components of the short circuited system or other systems of the vehicle.

When such a short circuit condition affects a safety-related system of a vehicle, such as an anti-skid brake control system, the potential problems may become critical ones that interfere with safe vehicle operation. For example, a typical electrical system for controlling skid of a vehicle by over-riding manual operation of the vehicle brakes upon sensing a skid condition may dump or release via a conventional modulator valve part or all of the brake operating fluid pressure, such as air pressure, which the driver may be attempting manually to apply by foot operation of the brake pedal, in an automatic effort to allow the skidding vehicle wheels to regain traction on the roadway before maximum braking is tried again. In U.S. Pat. No. 3,917,359 such an anti-skid brake control system is described. In that patent there is also described a circuit to switch off or to disable the anti-skid control system, when an open circuit fault condition occurs in one of the sensors that detects wheel speed, thereby to return to the driver absolute control of the vehicle brake system without improper automatic over-ride interference by the faulty control system and, thus, assuring that a failure of the latter will be in a safe direction. Moreover, in another anti-skid control system the detection of a fault, for example, such an open circuit fault, effects both a latching out of the skid control mechanism from affecting the vehicle brakes and at the same time the energizing of an indicator device to provide a warning signal to the driver that a fault has been detected and that the anti-skid brake control system is presently inoperative. When the anti-skid brake control system of the latter type is operating normally, it usually provides a positive voltage at a warning terminal output, which may be coupled to the mentioned indicator to preclude its energization, and when a fault has been detected by such system a negative or relative ground voltage is provided on that warning terminal output to effect energization of the indicator device.

If the warning terminal output of the above-mentioned system were inadvertently short circuited to the vehicle chassis, for example, the energized indicator device would then incorrectly signify to the driver that the anti-skid brake control system was latched out and that full manual control of the vehicle brakes had been returned to the driver; whereas, in fact, except for the false indication or signaling, the anti-skid brake control system actually would be properly operating.

SUMMARY OF THE INVENTION

In the present invention means are provided to detect a short circuit condition in an anti-skid brake control system, and upon such detection that means preferably effects disabling of the system, for example, to eliminate false signaling to the driver, to avoid relatively heavy current drain and possibly burning out of system components, to preclude unnecessarily draining the vehicle battery, and the like. Moreover, upon detecting such a short circuit, the detecting means also preferably effects a latching of the system in a disabled or cut-out condition, even if the short circuit opens by itself, until the overall anti-skid brake control system is reset, thus assuring that the driver will at least consider checking the system for such a fault.

One form of the invention utilizes a normally reverse biased rectifier circuit coupled to a latching amplifier circuit, which operates a switch that supplies power to a skid control circuit. The skid control circuit would normally detect a skid condition and then would operate a modulator valve to dump controlled amounts of the brake operating pressure in an effort to alleviate the skid condition. By removing power from the skid control circuit its operation is disabled. The occurrence of a short circuit at the warning terminal, for example, then causes forward biasing of the rectifier in the rectifier circuit ultimately to effect the latch out disabling of the anti-skid brake control system by terminating an electrical power input to the skid control circuit.

With the foregoing in mind, a primary object of the invention is to detect short circuit conditions, particularly in anti-skid brake control systems, and to disable such a system upon such detection.

Another object is to effect latch out disabling of an anti-skid brake control or like system in response to the detection of a short circuit.

An additional object is to protect the components of a circuit from excessive current that might be drawn by a short circuit.

A further object is to limit the duration that excessive power is drawn from an electrical power supply due to the occurrence of a short circuit in a system to which such supply is coupled.

These and other objects and advantages of the present invention will become more apparent as the following description proceeds.

To the accomplishment of the foregoing and related ends, the invention, then, comprises the features hereinafter fully described and particularly pointed out in the claims. The following description and the annexed drawing setting forth in detail a certain illustrative embodiment of the invention, this being indicative, however, of but one of the various ways in which the principles of the invention may be employed.

DESCRIPTION OF THE PREFERRED EMBODIMENT

Figure 1:
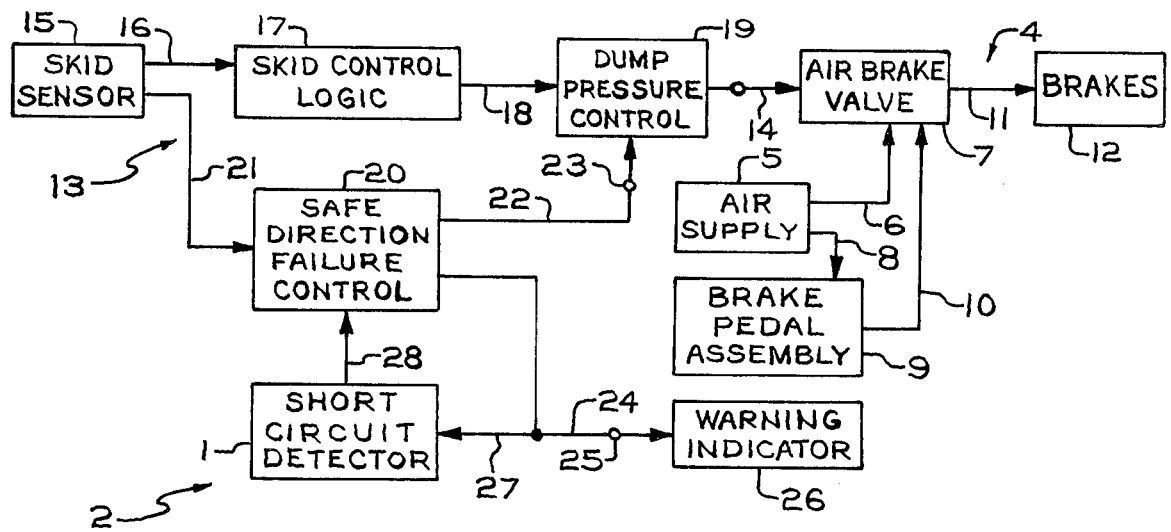
FIG. 1 is a functional block diagram of an anti-skid brake control system controllably coupled to the air brakes of a vehicle and including a short circuit detector portion in accordance with the invention.

Referring now more particularly to the drawing, wherein like reference numerals designate like parts in the several figures, and initially to FIG. 1, a short circuit detector circuit in accordance with the invention is indicated at 1 incorporated as part of an anti-skid brake control system 2 that is coupled to the air brake system 4 of a vehicle, not shown. In the air brake system 4 a primary supply of air pressure is provided from the vehicle air supply 5 via a fluid connection 6 to a air brake valve 7, and the air supply 5 is also connected by a fluid line 8 to the brake pedal assembly 9 of the vehicle. Therefore, the vehicle driver may manually operate the vehicle brake pedal by his foot, for example, to determine the amount of control air pressure supplied on fluid line 10 to the air brake valve 7 to open the latter a corresponding amount, thereby to provide a controlled amount of brake operating primary air pressure via the fluid line 11 to the vehicle air brakes 12 to operate the same to slow the vehicle.

The anti-skid brake control system 2 has a skid control portion 13 that produces an electrical signal on the line 14 to energize one or more solenoids in a conventional modulator valve portion, not shown, of the air brake valve 7 to dump a percentage of the primary air pressure being supplied to the vehicle brakes 12. The skid control circuit portion 13 includes a skid sensor 15, which senses the speed of the vehicle wheels and produces on the line 16 an electrical signal that is proportionally representative of the wheel speed; a skid control logic circuit 17, which interprets the signal produced by the skid sensor to produce an electrical signal on the line 18 indicative of whether a skid has been detected and, if so, the magnitude thereof; and a dump pressure control circuit 19 that is responsive to the skid control logic circuit output to produce an electrical signal output control on the line 14 for operating one or more solenoids in the modulator valve portion of the air brake valve 7 to dump predetermined percentages of the brake operating air pressure being called for by the driver depending on the magnitude of the detected skid. Various types of modulator valve portions for air brake valves are found in the prior art patent literature and, in particular, one such modulator valve with which the anti-skid brake control system 2 may be used is specifically disclosed in a brochure entitled "Triple Action Skid Control," published by B. F. Goodrich Co., March, 1975.

A safe direction failure control circuit 20, which may be coupled to various operative portions of the anti-skid brake control system 2, is illustratively shown coupled by the line 21 to the skid sensor 15. In the event that the skid sensor were to encounter a fault, whereby the skid sensor would present an open circuit condition, or in the event that any other operative portion of the anti-skid brake control system 2 monitored by the safe direction failure control 20 were to encounter an open circuit condition fault, the safe direction failure control would respond to the same to terminate the electrical power supply, for example, normally provided thereby on the line 22 to the power input terminal 23 of the dump pressure control circuit 19. Such termination of power on the line 22 disables the skid control circuit portion 13, and particularly the dump pressure control 19 thereof, so that the anti-skid brake control system 2 will not further affect the vehicle brake system until the detected fault has been corrected and the safe direction failure control has been reset. Thus, the safe direction failure control 20 includes a self-latching amplifier circuit arrangement or equivalent means therein to assure latch-out disabling of the anti-skid brake control system 2 after such an open circuit or other fault has been detected by the safe direction failure control. Moreover, upon detecting a fault, the safe direction failure control 20 produces an electrical output on the line 24, which is coupled via a warning terminal output 25 to a warning indicator 26, for example, on the veicle dashboard, to energize the warning indicator, which signifies to the driver that the anti-skid brake control system 2 has been disabled and that full manual control of the vehicle brake system has been returned to the sole control of the driver.

The short circuit detector circuit 1, as incorporated in the anti-skid brake control system 2, is coupled via the line 27 to the warning terminal output 25 to detect the occurrence of a short circuit condition at any point in the electrical circuit between the safe direction failure control 20 and the warning indicator 26. Upon detecting such a short circuit fault condition, the short circuit detector 1 produces an output on the line 28 that is coupled back to the safe direction failure control 20 to cause the latter to effect latch-out disabling of the anti-skid brake control system 2 until the short circuit condition has been corrected and the safe direction failure control 20 has been reset.

Figure 2:
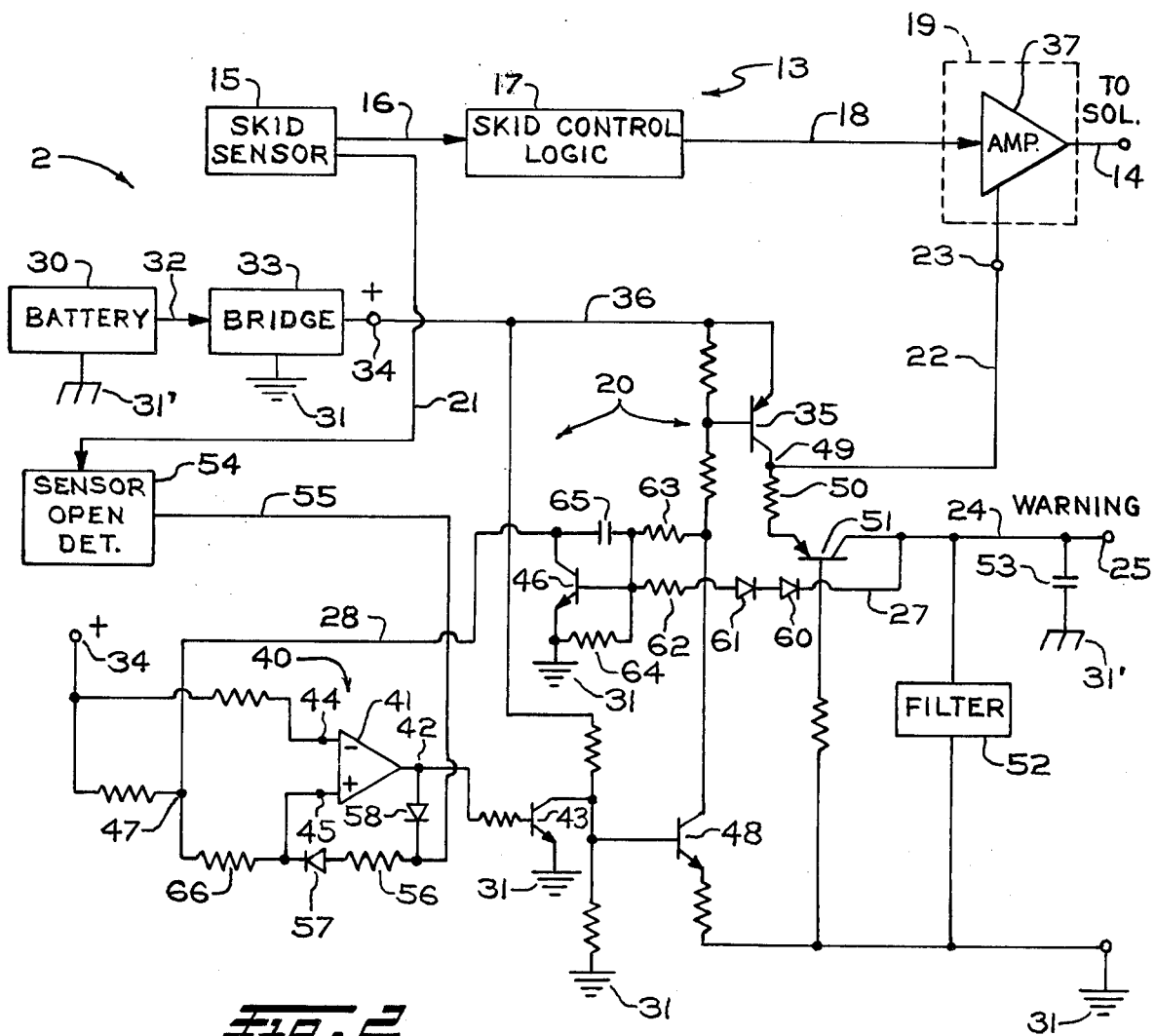
FIG. 2 is a schematic electric circuit diagram illustrating a short circuit detector circuit in accordance with the invention coupled in the anti-skid brake control system of FIG. 1.

Turning now more particularly to FIG. 2, a battery 30 is referenced at one terminal 31' to the relative ground connection of the vehicle, for example, the chassis, and is connected at its other terminal 32 via a conventional rectifier bridge 33, for example, for automatic polarity correction, to supply a positive input signal at the input terminal 34 of the anti-skid brake control system 2. Various other terminals illustrated in FIG. 2 having a positive or plus sign thereat also may be supplied with positive power via a connection, not shown, to the input terminal 34, and similarly those terminals in the figure having a typical ground terminal indication 31 would be coupled to the ground reference output of the bridge 33 as illustrated in FIG. 2.

Assuming that a power or switching transistor 35 in the safe direction failure control 20 is conductive, the regulated positive voltage will be coupled from the input terminal 34 and line 36 via the power transistor 35 to the line 22, and from the latter the positive voltage is provided at the terminal 23 as the power input to an amplifier 37 in the dump pressure control 19. Therefore, when a skid is detected by the skid sensor 15 and the skid control logic circuit 17, a signal on the line 18 controls the amplifier 37 in the dump pressure control 19 to supply power on the line 14 to energize a solenoid, for example, in the modulator valve portion of the air brake valve 7 to dump a percentage of the brake operating air pressure presently being called for by the vehicle driver by his manual operation of the brake pedal assembly 9.

The safe direction failure control 20 will maintain the power transistor 35 normally conductive as long as no fault has been detected. The safe direction failure control 20 includes a self-latching amplifier circuit 40 having a differential amplifier 41 that normally produces a low or negative output signal at its output 42 to maintain the transistor 43 cut off as long as the input electrical signal at the amplifier negative input 44 is more positive than the input electrical signal at the amplifier positive input 45. Moreover, a positive voltage on the line 36 normally maintains the transistor 46 conductive so that the voltage at the junction 47 is effectively grounded via the line 27. The relatively low signal at the output 42 of amplifier 41 maintains the transistor 43 cut off so that the transistor 48 will be conductive to hold the power transistor 35 in conduction. Moreover, the positive voltage at the collector junction 49 of the power transistor 35 also will be passed via the resistor 50 and the transistor 51 to the warning terminal output 25 to maintain the warning indicator 26, which is shown in FIG. 1, de-energized and, thus, signifying that the anti-skid brake control system 2 is operating normally. A conventional filter 52 coupled between the line 24 and the relative ground potential reference 31 prevents voltage spikes or noise from inadvertently affecting the anti-skid brake control system 2 operation. Similarly the capacitor 53 coupled between the line 24 and the chassis ground 31' prevents radio frequency signals from interfering with the operation of the anti-skid brake control system 2.

The safe direction failure control 20 has a detector device 54 that monitors the skid sensor 15 via the line 21 and in a conventional manner produces a positive voltage on the line 55 when an open circuit condition exists in the skid sensor. The positive voltage on the line 55 acts through a resistor 56 and a diode 57 to raise the voltage at the positive input terminal 45 of the amplifier 41 causing the latter to produce a positive voltage signal at its output 42. The positive voltage at the output 42 is provided as positive feedback via a diode 58 to self-latch the amplifier 41 maintaining that positive output voltage until subsequently reset by temporarily removing all power to the amplifier circuit 40.

The positive voltage at the output terminal 42 turns on the transistor 43, which in turn cuts off the transistor 48. Cut off of the transistor 48 also effects cut off of the power transistor 35 to remove the positive voltage at the terminal 23 to the amplifier 37 in the dump pressure control 19, thus disabling the anti-skid brake control system 2 by preventing the production of a voltage on the line 14 until the sensed open circuit fault condition has been corrected and the amplifier circuit 40 has been reset. Furthermore, the removal of the positive voltage at the collector terminal of the power transistor 35 also removes the positive voltage from the warning terminal output 25, thereby effecting energization of the warning indicator 26 to warn the driver that the anti-skid brake control system 2 has been disabled.

If the warning terminal output 25 were to become inadvertently grounded to the vehicle chassis, for example, while the remainder of the anti-skid brake control system 2 were operating in a normal manner, the warning indicator 26 would become energized to signify the disabling of the anti-skid brake control system even though such system would actually be fully operational. The short circuit detector circuit 1 upon detecting such a short circuit fault condition acts through the safe direction failure control 20 to disable the anti-skid brake control system 2 as will be described further below.

The short circuit detector circuit 1 includes a pair of diodes 60, 61, a current limiting resistor 62, a pair of bias resistors 63, 64, a capacitor 65, and the transistor 46. The collector of the transistor 46, as was described above, is coupled by the line 28 to the input junction 47 of the self-latching amplifier circuit 40, and the series-connected diodes 60, 61 are connected by the line 27 to the line 24 and the warning terminal output 25.

The positive voltage that normally appears on line 24 when the power transistor 35 is conductive will reverse bias the diodes 60, 61 so that the transistor 46 is maintained conductive to hold the voltage at the junction 47 substantially at ground potential. However, a short circuit occurring between the line 24 and the vehicle chassis, for example, will draw excessive current through the resistor 50 and the transistor 51 while dropping the potential of the line 24 down to relative ground potential. Grounding of the line 24 effects forward biasing of the diodes 60, 61, which causes cut off of the transistor 46. Therefore, the voltage rises at the junction 47, and that voltage acts through the resistor 66 to raise the voltage at the positive input terminal 45 of the amplifier 41 causing the latter to produce a relatively high voltage signal at its output terminal 42. The high voltage at the output terminal 42 again self-latches the amplifier 41 to continue producing such high voltage signal and additionally acts in the above-described manner to turn transistor 43, which cuts off transistor 48 that also cuts off the power transistor 35. Therefore, the anti-skid brake control system 2 is disabled; the relatively large current through the resistor 50 and the transistor 51, which might cause them to burn out, is relatively promptly terminated; uncontrolled current drain from the battery 30 through the short circuit is promptly terminated; and the driver is warned that the system 2 has been disabled. When the short circuit fault condition is corrected and the self-latching amplifier circuit 40 is reset by temporarily interrupting power thereto, the anti-skid brake control system 2 will again operate in its normal intended manner.

The resistor 62 protects the transistor 46 from possible damage that could otherwise be caused by negative transient voltages that may appear at the warning terminal output 25 due to the vehicle or automotive environment in which the anti-skid brake control system 2 is employed. Moreover, although only one of the diodes 60, 61 would be necessary to obtain the above-described operation of the short circuit detector 1, the two series-connected diodes 60, 61 are preferred for overall reliability. When using the two diodes in the manner disclosed herein, a shorting of one of the diodes will still allow the other of them to operate properly in the above-described manner to disable the anti-skid brake control system when a short circuit is detected between the warning terminal output 25 and the vehicle chassis, etc.

It will be appreciated that although the short circuit detector 1 of the invention has been described above with reference to operation in response to the presence of a short circuit between the warning terminal output 25 and the chassis of the vehicle in which the anti-skid brake control system 2 is employed, the short circuit detector 1 may be used to detect short circuits occurring in other portions of the anti-skid brake control system and in like systems with appropriate compensation or filtering if there are alternating voltage signals present under normal conditions at such portions. Moreover, although the disclosure presents an embodiment of the invention used in a vehicle or other system with a relative negative ground reference, it will be appreciated that the short circuit detector with obvious modifications thereto could be similarly employed in equivalent embodiments to provide short circuit protection in vehicles or other systems with a relative positive ground reference.

The embodiments of the invention in which an exclusive property or privilege is claimed are defined as follows:

1. In an anti-skid brake control system for normally overriding manual operation of the brakes of a vehicle upon sensing a skid condition, and wherein the anti-skid brake control system includes disabling means for disabling said system upon detecting a fault condition in the latter and means for indicating to the operator of the vehicle that such a disabling of said system has occurred and, therefore, that said system is disabled from overriding manual operation of the vehicle brakes, the improvement comprising:
short circuit detector means for detecting a short circuit condition in said system at said means for indicating, said short circuit detector means being coupled in said system to effect disabling of said system from controlling the vehicle brakes upon detecting such a short circuit condition.

2. The improvement of claim 1, wherein said disabling means includes a self-latching circuit to maintain said system disabled upon detecting such a fault condition until the fault condition is eliminated and said self-latching circuit is reset, and said system includes output terminal means for delivering respective electrical signals to said means for indicating to maintain the same de-energized when no fault has been detected and to energize the same when a fault has been detected, and wherein said short circuit detector means is electrically coupled to said output terminal means for detecting a short circuit condition of said output terminal means and includes means for controlling said self-latching circuit to so disable said system upon detecting such a short circuit condition.

3. The improvement of claim 2, wherein said short circuit detector means comprises rectifier means electrically coupled in said system to said output terminal means to be maintained normally reverse biased by a respective electrical signal at the latter when said system is operating properly and is not disabled and to be forward biased upon occurrence of such a short circuit condition of said output terminal means.

4. The improvement of claim 3, wherein said means for controlling comprises a transistor circuit means coupled to said self-latching circuit for triggering the same to disable said system, and wherein said rectifier means is coupled to said transistor circuit means for permiting the latter to be conductive when the former is so reverse biased and for cutting off said transistor circuit means when said rectifier means is so forward biased, thereby to control said self-latch circuit to disable said system.

5. The improvement of claim 4, wherein said rectifier means comprises a plurality of series-connected diodes.

* * * * *